May 19, 1931.  E. A. SPERRY, JR  1,805,854
NONPENDULOUS GYROCOMPASS
Filed Nov. 8, 1919  2 Sheets-Sheet 2
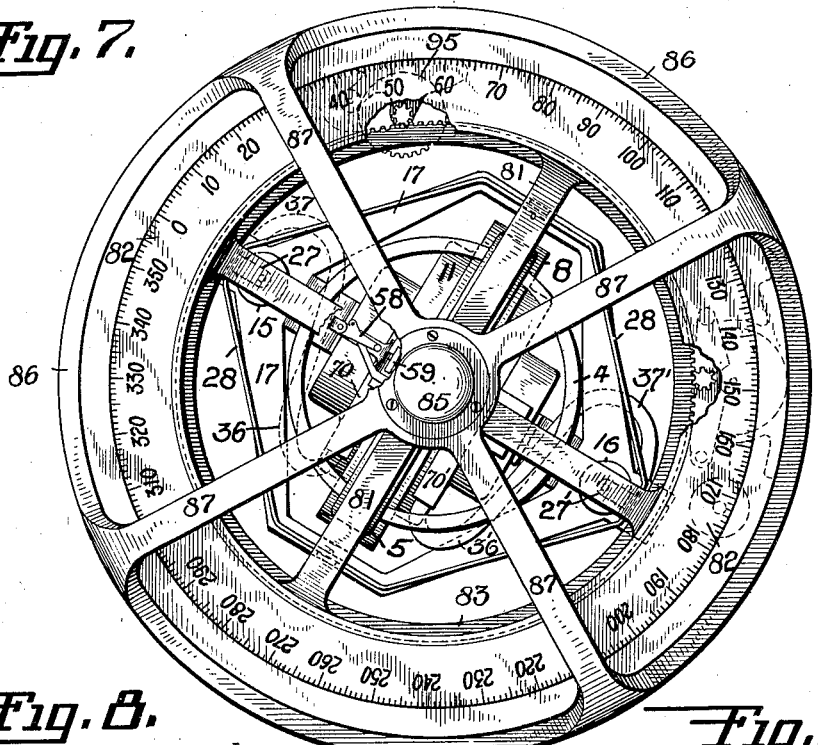
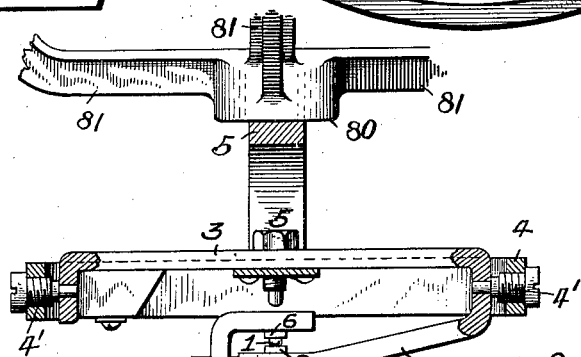
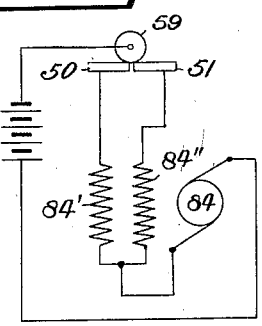
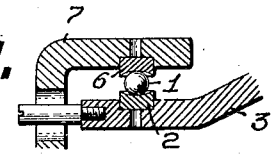
INVENTOR
ELMER A. SPERRY, JR.
BY Herbert H. Thompson
HIS ATTORNEY Patented May 19, 1931

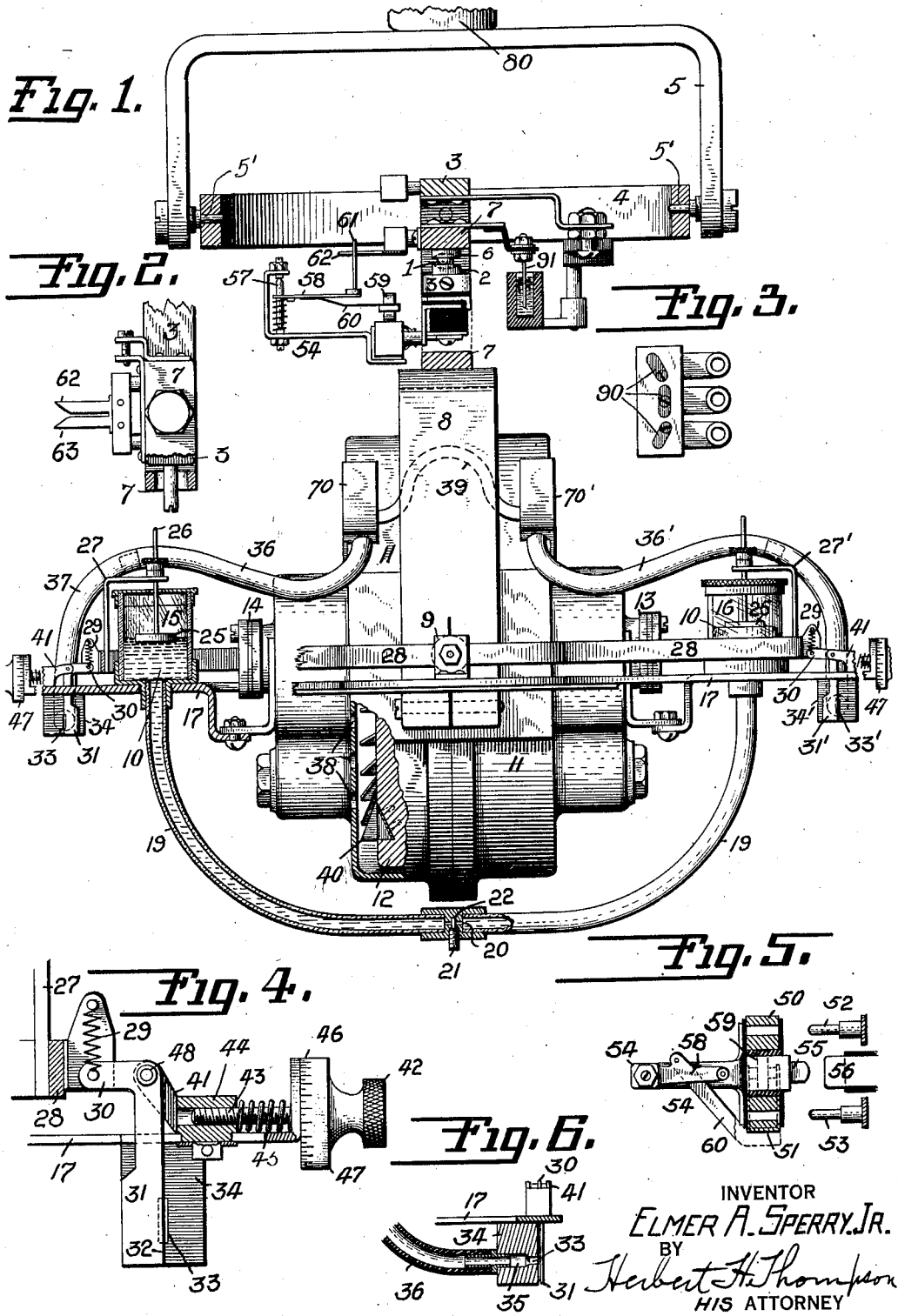

1,805,854

UNITED STATES PATENT OFFICE

ELMER A. SPERRY, JR., OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

NONPENDULOUS GYROCOMPASS

Application filed November 8, 1919. Serial No. 336,690.

This invention relates to gyroscopic compasses especially designed for navigation wherein the usual source of errors arising from the rolling, pitching, and yawing are eliminated, but more specifically the invention relates to an improved damping means for the type of compass disposed in a copending application of Harry L. Tanner, Serial No. 263,118, filed November 19, 1918, "Gyroscopic compasses".

A further object of the invention is to devise an improved suspension for gyroscopic compasses in which the necessity for balancing about the vertical axis is eliminated and at the same time the use of the mercury float supporting the compass rendered unnecessary.

A further object of the invention is to improve upon the existing forms of damping means for gyroscopic compasses.

Referring to the drawings in which what I now consider the preferred form of my invention is shown:

Fig. 1 is a west elevation, partly in section, of my improved gyroscopic compass.

Fig. 2 is a detail plan showing the fork for operating the trolley on the part of the follow-up system.

Fig. 3 is a detail plan of the mercury cups transmitting driving current to the gyro rotor.

Fig. 4 is an enlarged side elevation of the means for varying the reaction of the air jets for damping the compass.

Fig. 5 is a sectional detail of a contact plug for the follow-up trolley.

Fig. 6 is a detail of one of the air jets.

Fig. 7 is a plan view of the compass.

Fig. 8 is a sectional view taken at right angles to Fig. 1 through the support for the compass.

Fig. 9 is an enlarged sectional detail through the ball support.

Fig. 10 is a wiring diagram of the follow-up system and showing details of the support.

Fig. 11 is a detail of a horizontal pivot for the rotor casing.

According to my invention the entire weight of the compass is supported by a single small ball 1 preferably of highly polished, hardened steel, said ball furnishing a bearing not only for the oscillation of the compass about the horizontal axes but also for rotation about the vertical axis. The ball is supported at the bottom by block 2 preferably also formed of hard steel or a smooth stone or jewel cupped to seat the ball and highly polished. Said block is supported on the member 3 mounted in the gimbal ring 4 on pivots 4', (see Fig. 8) which ring in turn is pivoted on the supporting frame 5 by pivots 5'—5' (Fig. 1) of the compass. Preferably the ball is located below the gimbal axes 4' as shown. Resting upon the top of the ball is a second hardened block 6, this also preferably being cupped. Said block is secured to the U-shaped frame 7 (see Fig. 8), which is connected to, or forms a part of, the vertical ring 8 of the compass. Said ring 8 supports on horizontal pivots 9 the rotor bearing casing or frame 11 of the gyro wheel proper 12. Said wheel may be driven in any suitable manner such as by an induction motor built in as a part of the wheel in the well known manner. Current is led from the outer follow-up frame to the "sensitive" element, by means of a plurality of mercury cups 90 on frame 3, into which contact fingers 91 on member 6 extend. The cups need be no longer than the normal extent of relative oscillation of the sensitive and follow-up elements as the usual practice in gyroscopic compasses, (see patent to Elmer A. Sperry, 1,300,890 of April 15, 1919). Said wheel is journalled on transverse bearings 13, 14 in the casing. Preferably the rotor casing together with attached parts is substantially balanced about the axis 9 so that normally the gyroscope may be said to possess three degrees of freedom, i. e. about the horizontal spinning axis 13, 14, about the other horizontal axis 9, and about the vertical axis.

To further eliminate friction about the vertical axis I may provide a follow-up system for the support 3 of the ball 1. For this purpose a pair of reversing contacts 50 and 51 are secured to the frame 3. Preferably these contacts are entirely insulated from the frame and connected thereto through plugs 52 and 53 inserted in lateral holes in the contacts.

The entire bracket 54, which supports the trolley and also the contact blocks, is grounded or connected to the third wire of the system by means of contacts 55 between which the plug 56 is inserted. Said bracket rotatably carries the pintle 57 on which the arm 58 is mounted. Secured to said arm is a trolley 59 rotatably mounted on a flat spring 60 on the arm. The relative movement between the support and the suspended frame is imparted to the trolley by means of an upwardly extending pin 61 which extends between the forks 62 and 63 secured to the supporting frame. By this means no wires need be led into the sensitive element.

A central stem 80 having radially extending arms 81 rises from frame 5, the arms supporting the card 82, and large gear 83. Said gear is driven from a reversible motor 84, forming a part of the follow-up system and in circuit with trolley 59. Fig. 10 shows the wiring, contact blocks 50 and 51 being in circuit with oppositely wound fields 84' and 84" of the motor, respectively. The whole frame is rotatably mounted and suspended from a long bearing (not shown) under cap 85, the stationary portion of the bearing and cap being supported from ring 86 by arms 87. The gear 83 may also drive a transmitter 95 for repeating the compass readings at distant points, if desired.

In order to impart directive force or in other words north seeking properties, to the compass a liquid container or containers 15 and 16 are mounted on the compass. Preferably a pair of containers are employed, as shown, the same being mounted on annular platforms 17 secured to the casing. The containers are placed on opposite sides of pivots 9 in the north-south direction and are preferably so situated that the top of the liquid is about on a level with or a little above the pivots 9. The said containers are connected through a tube 19 or the like so that the liquid therein may flow from one container to the other on inclination of the compass. Preferably a heavy, non-viscous liquid such as mercury 10 is employed in the containers. The rate of flow between the containers may be adjusted by means of a restricted passage 20 in the said tube, said passage being more or less closed as may be required by means of a set screw 21 having a small shank 22 extending more or less across the restricted passage 20. The rate of flow desired between the two containers or the period of oscillation of the liquid depends upon many factors. One of the important factors is that the rate of flow should be slow enough so that a negligible quantity of liquid is interchanged on ordinary oscillations of the compass due to rolling and pitching of the ship. At the same time the rate of flow should be sufficiently rapid to permit an appreciable inter-change of liquid when the compass becomes inclined due to the rotation of the earth.

As explained in the aforesaid application of Harry L. Tanner the action of such a compass is somewhat similar to that of a top heavy gyroscopic compass in that the liquid by running to the low side on inclination of the compass tends to cause further tilting of the compass. This particular embodiment of the invention employs a gyro wheel revolved in the opposite direction to the earth.

The proper damping of such a compass presents a more serious problem than the damping of a gyroscopic compass rotating in the same direction as the earth since it may be said to be inherently unstable, any friction tending to increase rather than diminish oscillation. For damping any compass, and especially a compass of this character, it is extremely important that a base line be obtained in order to bring forces into action by relative inclination of the gyroscope and base line for applying a damping torque. For obtaining such a base line I prefer to make use of the liquid in the containers 15 and 16 since such liquid will, of course, remain substantially level. For this purpose a float 25 is placed within each casing. Rising from the float is a stem 26 connected to an arm 27 or the like which in turn is connected to a ring or link 28 extending transversely to the gyroscope and joined adjacent its other end to the corresponding arm 27' on the other container 16. Said ring is pivoted at opposite sides to the platform 17 secured to the gyro casing so that a relative change in the position of the gyroscope and liquid will immediately cause a relative change in the position of the ring 28 and platform 17. Said relative movement is employed to bring into action the damping means.

Preferably means are employed to magnify such relative movement so that greater sensitiveness is secured. For this purpose the ring 28 is connected adjacent each end to the shorter arm 30 of the bell crank lever preferably through the intermediary of a weak spring 29. Said lever is shown as pivoted at 48 on bracket 41 mounted on platform 17. The longer arm 31 of the lever extends downwardly with the straight edge 32 thereof normally lying adjacent or partially over the slot or jet 33. Preferably said opening is rectangular in shape with the major axis lying along the vertical edge 32 of the lever. Said opening is provided in a block 34 situated immediately back of the lever, said block having an aperture 35 therethrough into which air or other fluid is led by means of pipe 36. Preferably a portion 37 at least of said pipe is flexible, said pipe being connected to one side of the casing 11. A similar pipe 36' leads from the opposite side of the casing to the other jet 33'.

By employing a resilient means such as spring 29 between the bell crank lever and the ring 28 the accuracy and sensitiveness of the compass is greatly increased since the slight jarring of the instrument due to the running of the gyroscope or otherwise will cause enough vibration of the spring and lever to keep the bearing 48 by which the lever is mounted on the bracket 41 free.

It will be readily seen that as the gyro wheel revolves rapidly, air will be drawn in near the center of the wheel through openings 38 in the casing and will be expelled through the two pipes 36 and 36' and out the openings 33 and 33' thus constituting a constantly available source of power. To insure substantially equal rates of discharge of air from the openings an equalizing passageway such as tube 39 may connect the pipes 36 and 36' or the enlargements 70 and 70' in the casing into which said pipes enter. The rotor 12 may be provided with vanes 40 to increase the volume of air discharged through the openings if desired. Of course, it is extremely important that levers 31 and 31' be adjusted so that the reactions from the air discharged through each jet are normally equal. For this purpose the bracket 41 on which each bell crank lever is pivoted may be slidably mounted on frame 17 and is accurately adjusted by means of a thumb piece 42 having a threaded shank 43 threaded in boss 44 on the bracket. A spring 45 may be provided to hold the nut in position. Also graduations 46 are shown on the enlarged portion 47 of the nut to aid in adjustment.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic compass, the combination with a gyro-rotor and journal casing therefor, a frame in which said casing is mounted for oscillation about a horizontal axis, a support for the frame, and means for suspending said frame for movement about a vertical axis comprising a ball freely resting on said support and on which said frame is pivotally suspended.

2. In a gyroscopic compass, the combination with a gyro-rotor and journal casing therefor, a frame in which said casing is mounted for oscillation about a horizontal axis, means for suspending said frame for movement about a vertical axis and for oscillation about horizontal axes comprising a ball on which the frame is supported, and a universally mounted support for said ball.

3. In a gyroscopic compass, a universally mounted support, a jeweled bearing mounted thereon, a ball on said bearing, a frame having a second jeweled bearing supported on said ball for turning about a vertical axis, and a gyroscope carried by said frame.

4. In a gyroscopic compass, the combination with a gyroscope mounted with three degrees of freedom, of a liquid container mounted on either side of the gyroscope, a connection for transmitting liquid between the containers on tilting of the gyroscope to impart meridian seeking properties thereto, a source of energy independent of said liquid for damping the oscillations of the gyroscope, and means whereby said source of energy is controlled by the change of level of said liquid.

5. In a gyroscopic compass, the combination with a gyroscope supported for freedom about vertical and horizontal axes, of a movable mass supported thereby for producing orientation of the compass, means whereby said mass may shift its relation to the center of gravity of the gyroscope upon inclination thereof, a source of energy independent of said mass, and means whereby said source of energy is responsive to such shift for applying a torque about the vertical axis of the gyroscope.

6. A gyroscopic compass comprising a substantially non-pendulous gyroscope, means brought into action upon inclination of the gyroscope for gravitationally increasing said inclination, and a source of power supply responsive to such inclination for exerting a damping torque about the vertical axis of the gyroscope.

7. In a gyroscopic compass, the combination with a gyroscope mounted for turning about vertical and horizontal axes, of a liquid level on said gyroscope, and a source of power supply brought into action by a change in the position of said liquid for applying a torque about the vertical axis of said gyroscope.

8. In a gyroscopic compass, the combination with a gyroscope mounted for turning about vertical and horizontal axes, said gyroscope being normally balanced about said horizontal axis, gravitational means for exerting a torque about said horizontal axis on inclination of the gyroscope for imparting to the compass meridian seeking properties, an independent source of power supply adapted to exert a torque about the vertical axis of the gyroscope, said power supply source being also controlled by said gravitational means.

9. In a gyroscopic compass, a gyro-wheel, a casing therefor, a plurality of jets through which air is expelled, said outlets being arranged to have opposite reactions upon the gyroscope about an axis, means on the gyroscope adapted to maintain a fixed relation to the vertical, a member moved by a change in the relation between the gyroscope and said means, and a second member connected to the first member so that it is moved through a greater distance for varying the relative reactions of said outlets.

10. In gyroscopic apparatus, the running of which causes vibration, the combination with a jet adapted to discharge a fluid for exerting a torque on the gyroscope, a member movably positioned adjacent the jet for varying the torque exerted thereby, a control device for said member and a spring connecting said device and member whereby the vibration of the gyroscope maintains said member free in its mounting.

11. In a gyroscopic compass, a follow-up support, a sensitive element carried by said support, a plurality of contacts mounted on said support, a relatively movable cooperating contact pivoted on said support, means operating between said sensitive element and said movable contact for imparting movement thereto, and motive means controlled by said contacts for turning said support to follow the movements of said sensitive element.

12. In a gyroscopic compass, the combination with a gyro-rotor and journal casing therefor, a frame in which said casing is mounted for oscillation about a horizontal axis, means for suspending said frame for movement about a vertical axis comprising a ball on which the frame is supported, a supporting member for said ball, and means for causing said member to follow the movements of said frame about said vertical axis.

13. In a gyroscopic compass, a universally mounted support, a jeweled bearing mounted thereon, a ball on said bearing, a frame having a second jeweled bearing supported on said ball for turning about a vertical axis and for oscillation about horizontal axes, a gyroscope carried by said frame, and means for causing said support to follow the movements of said gyroscope about said vertical axis.

14. In gyroscopic apparatus, the running of which causes vibration, the combination with a jet adapted to discharge a fluid for exerting a torque on the gyroscope, a member pivotally supported adjacent the jet for varying the torque exerted thereby, a control device for said member and a spring connecting said device to a point on said member nearer the pivot than the jet, the vibration of the gyroscope serving to maintain said member free on its pivot.

15. In gyroscopic apparatus, the running of which causes vibration, the combination with a jet connected to the gyroscope and adapted to discharge a fluid for exerting a torque on the gyroscope, a member pivotally positioned adjacent the jet, means whereby the relative positions of said member and jet vary the torque exerted by said jet, a control device for said member, a spring connecting said device and member, and means whereby the relative position of said member and jet may be adjusted.

16. In a gyroscopic compass, a universally mounted support, a jeweled bearing mounted thereon, a ball on said bearing, a frame having a second jeweled bearing supported on said ball for turning about a vertical axis, a gyroscope carried by said frame, means for causing said support to follow the movements of said gyroscope about said axis, and means for causing relative oscillation between said frame and support.

17. In a gyroscopic compass, the combination with a gyro-rotor and journal casing therefor, a frame in which said casing is mounted for oscillation about a horizontal axis, means for suspending said frame for movement about a vertical axis comprising a ball on which the frame is supported, a universally mounted support for said ball, and means for causing relative oscillation between said frame and support.

18. In gyroscopic apparatus, the combination with a jet adapted to discharge a fluid for exerting a torque on the gyroscope, a member pivotally positioned adjacent the jet for varying the torque exerted thereby, a control device for said member, means whereby said control device is actuated from said gyroscope and a connection between said device and member connected to the latter at a point nearer the pivot thereof than the jet.

19. In a gyroscopic compass, the combination with the sensitive element, of a following element rotatably mounted adjacent said sensitive element, a contact mounted on said following element, a relatively movable cooperating contact movably mounted on said following element, means for causing movement of said last named contact into engagement with said first contact on relative movement between said sensitive and following elements and motive means operated by said contacts for turning said following element.

20. In a gyroscopic compass, the combination with the sensitive element, of a following element rotatably mounted adjacent said sensitive element, a pair of reversing contacts mounted on said following element, a relatively movable cooperating contact pivoted on said following element, means for causing movement of said last named contact into engagement with the respective reversing contact on relative movement between said sensitive and following elements and motive means operated by said contacts for turning said following element.

21. A gyro-compass comprising a rotor and casing mounted to turn about both horizontal and vertical axes, inter-connected liquid containers carried by the casing on opposite sides of the rotor plane of rotation so that tilt or inclination of the casing due to the earth's rotation causes a liquid mass transfer producing orientation, an independent source of power, and means whereby said power is rendered operative by said mass transfer to exert a torque about the vertical axis.

22. In a gyro-compass oriented by liquid mass transfer across the horizontal axis of inclination or tilt of the rotor casing, blocks located on opposite sides of the rotor casing adjacent the liquid mass containers carried by said casing, air jet openings in said blocks, means for supplying to said air jet openings a blast of compressed air, and means whereby change in liquid level in the containers causes corresponding change in the air jets to change the reactive effect of said jets and produce a damping torque around the vertical axis of oscillation.

23. In a liquid controlled gyro-compass, the combination with connected gyro-controlling liquid containers, of a float in each container, a source of power, and means brought into action by relative movement, in one direction or the other, between said containers and the floats for causing said source of power to apply a torque on the compass, in one direction or the other, to produce damping of the gyroscope.

24. In a liquid controlled gyro-compass, the combination with connected gyro-controlling liquid containers, of a float in each container, a source of air pressure, a jet cooperating with each float through which air may flow, and a closure for each jet connected to the cooperating float and moved by relative movement between said containers and said floats, said jets being connected to said gyroscope so that their differential reactive effect produces damping of the gyroscope.

25. In a liquid controlled gyro-compass, the combination with connected gyro-controlling liquid containers, of a float in each container, a source of air pressure, a horizontally directed jet adjacent each float through which air is caused to flow by said source, said two jets being oppositely directed, a vane adjacent each jet, and means connecting each of said vanes and the corresponding float and gyro structure for displacing the vane on relative change in position of the float and gyro structure.

26. In a gyroscopic compass, the combination with a gyroscope mounted with three degrees of freedom, of a liquid container mounted on either side of the gyroscope, means for gravitationally transferring liquid between the containers on tilting of the gyroscope whereby the north seeking property is imparted to the compass, differential air reaction damping means, and means whereby said damping means is brought into action by the liquid transfer between said containers.

27. In a gyroscopic compass, the combination with a gyroscope mounted with three degrees of freedom, of a liquid container mounted on either side of the gyroscope, a pipe whereby liquid may be transferred between the containers on tilting of the gyroscope whereby the north seeking property is imparted to the compass, means controlled by the relative tilt of the gyroscope and the liquid level in said containers, and power means controlled by said first means for damping the compass.

In testimony whereof I have affixed my signature.

ELMER A. SPERRY, Jr.